(12) United States Patent
Mei et al.

(10) Patent No.: US 12,180,431 B2
(45) Date of Patent: Dec. 31, 2024

(54) PHOSPHORUS COAL GASIFICATION REACTION DEVICE FOR COMBINED PRODUCTION OF YELLOW PHOSPHORUS AND SYNGAS

(71) Applicants: Kunming University of Science and Technology, Kunming (CN); Zhejiang Chengtai Chemical Machinery Co., Ltd., Huzhou (CN)

(72) Inventors: Yi Mei, Kunming (CN); Chi Zhai, Kunming (CN); Yunxiang Nie, Kunming (CN); Jinlin He, Huzhou (CN); Huili Liang, Huzhou (CN)

(73) Assignees: KUNMING UNIVERSITY OF SCIENCE AND TECHNOLOGY, Kunming (CN); ZHEJIANG CHENGTAI CHEMICAL MACHINERY CO., LTD., Huzhou (CN)

( * ) Notice: Subject to any disclaimer, the term of this patent is extended or adjusted under 35 U.S.C. 154(b) by 265 days.

(21) Appl. No.: 17/854,140

(22) Filed: Jun. 30, 2022

(65) Prior Publication Data
US 2023/0002693 A1   Jan. 5, 2023

(30) Foreign Application Priority Data
Jun. 30, 2021   (CN) .......................... 202110736690.7

(51) Int. Cl.
C10J 3/84   (2006.01)
C01B 25/027   (2006.01)

(52) U.S. Cl.
CPC ............ *C10J 3/845* (2013.01); *C01B 25/027* (2013.01); *C10J 2300/093* (2013.01); *C10J 2300/1625* (2013.01)

(58) Field of Classification Search
CPC .... C10J 3/845; C10J 3/526; C10J 2300/0906; C10J 2300/1625; C10J 2300/093;
(Continued)

(56) References Cited

U.S. PATENT DOCUMENTS

| 4,073,627 A | * | 2/1978 | Anderson | C10J 3/08 48/DIG. 2 |
| 4,377,392 A | * | 3/1983 | Massey | B03B 1/00 44/503 |

(Continued)

FOREIGN PATENT DOCUMENTS

| CN | 107739025 A | * | 2/2018 | ........... C01B 25/027 |
| CN | 111363591 A | * | 7/2020 | |
| CN | 111394133 A | * | 7/2020 | |

OTHER PUBLICATIONS

Machine Translation of CN-107739025-A (May 8, 2024) (Year: 2024).*

(Continued)

*Primary Examiner* — Matthew J Merkling
(74) *Attorney, Agent, or Firm* — MCDONNELL BOEHNEN HULBERT & BERGHOFF LLP

(57) ABSTRACT

Disclosed is a phosphorus coal gasification reaction device for combined production of yellow phosphorus and syngas, including a stock bin, a mineral aggregate lock hopper, a phosphorous coal gasification reactor, a slag quench chamber and a slag lock hopper. In the phosphorous coal gasification reactor, a drying zone, a dry distillation zone, a combustion zone, a phosphate rock reduction zone, and a slag bath zone are formed from top to bottom. A gas product outlet communicating with the phosphorous coal gasification reactor is installed at a top of the phosphorous coal gasification reactor, two to eight fuel burners are symmetrically arranged on the combustion zone, and an auxiliary burner communicating with the slag bath zone is arranged at (Continued)

the bottom of the slag bath zone. The reactor device can improve the production capacity of the yellow phosphorus, and reduce the emission of $CO_2$.

7 Claims, 1 Drawing Sheet

(58) Field of Classification Search
CPC ....... C01B 3/02; C01B 25/003; C01B 25/047; C01B 2203/0415; C01B 2203/0465
See application file for complete search history.

(56) References Cited

U.S. PATENT DOCUMENTS

| | | | | |
|---|---|---|---|---|
| 2001/0045397 | A1* | 11/2001 | Shah | C10G 2/32 210/749 |
| 2010/0288711 | A1* | 11/2010 | Kowoll | C10J 3/52 210/153 |
| 2011/0192079 | A1* | 8/2011 | Schmit | B02C 23/34 44/621 |
| 2012/0009112 | A1* | 1/2012 | Kinose | C01B 25/20 423/322 |

OTHER PUBLICATIONS

Machine Translation of CN111363591A (May 10, 2024) (Year: 2024).*
Machine Translation of CN-111394133-A (Aug. 27, 2024) (Year: 2024).*

* cited by examiner

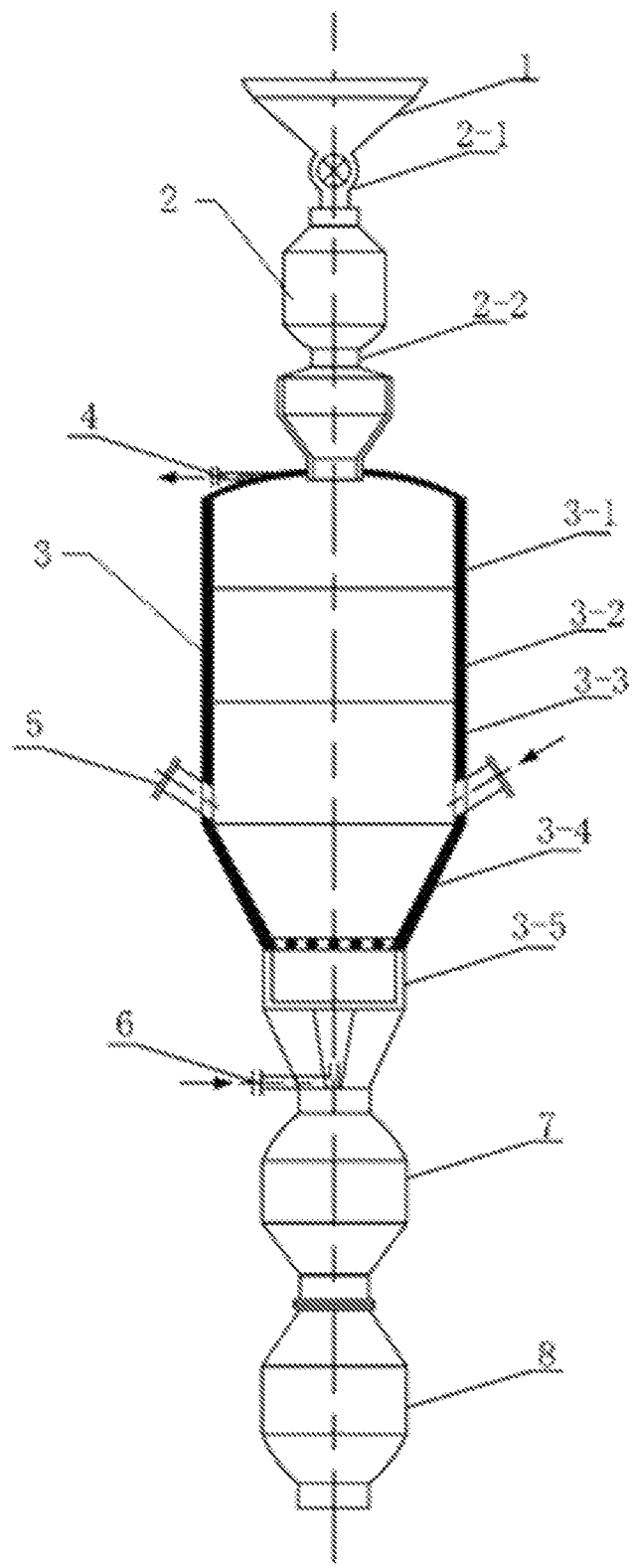

PHOSPHORUS COAL GASIFICATION REACTION DEVICE FOR COMBINED PRODUCTION OF YELLOW PHOSPHORUS AND SYNGAS

CROSS REFERENCE TO RELATED APPLICATION

This patent application claims the benefit and priority of Chinese Patent Application No. 202110736690.7 filed on Jun. 30, 2021, the disclosure of which is incorporated by reference herein in its entirety as part of the present application.

TECHNICAL FIELD

The present disclosure relates to the technical field of phosphorus and coal chemical industry, and particularly relates to a phosphorus coal gasification reaction device for combined production of yellow phosphorus and syngas.

BACKGROUND ART

Yellow phosphorus is an important chemical raw material and is an important intermediate product in the chemistry industry, which is widely used in the fields of medicines, electronics, foods, surfactants, and the like. At present, the main approach for industrial production of yellow phosphorus is an electric furnace method, the power consumption for producing one ton of phosphorus is as high as 13,800 to 14,500 kWh. Coal gasification, which is one of the most widely used and mature technologies in the coal chemical industry, is an important link in the synthesis of coal-based chemicals. In the coal gasification process, the temperature at the combustion zone of coal and pure oxygen is as high as 1,800 to 2,000° C., and a large amount of cooling medium are required for discharging heat to maintain the heat balance of the system. Therefore, two original independent systems have the following problems: (1) the reduction of yellow phosphorus requires heat supplied by electrical energy (2) a large amount of heat generated in the coal gasification needs to be discharged; and (3) the total amount of CO produced by carbon reduction of phosphate rock is small and difficult to be used on a large scale.

SUMMARY

A technical problem to be solved by the present disclosure is how to provide a phosphorus coal gasification reaction device for combined production of yellow phosphorus and syngas, which can improve production capacity of the yellow phosphorus and reduce $CO_2$ emission.

To solve the technical problem above, the present disclosure provides the phosphorus coal gasification reaction device for combined production of yellow phosphorus and syngas. The phosphorus coal gasification reaction device for combined production of yellow phosphorus and syngas includes a stock bin, a mineral aggregate lock hopper, a phosphorous coal gasification reactor, a gas product outlet, combustion burners, an auxiliary burner, a slag quench chamber, and a slag lock hopper. A discharge port of the stock bin is connected to the mineral aggregate lock hopper by an inlet airlock valve, and a lower opening of the mineral aggregate lock hopper is connected to an upper feeding port of the phosphorous coal gasification reactor by an outlet airlock valve. A slag discharge port at a bottom of the phosphorous coal gasification reactor is connected to an inlet of the slag quench chamber, and a slag outlet of the slag quench chamber is connected to an inlet of the slag lock hopper, and molten slags are discharged via the slag lock hopper. The phosphorus coal gasification reactor is divided into a drying zone, a dry distillation zone, a combustion zone, a phosphate rock reduction zone, and a slag bath zone from top to bottom. The gas product outlet communicating with the phosphorus coal gasification reactor is installed at a top of the phosphorus coal gasification reactor, and two to eight combustion burners are symmetrically arranged on the combustion zone; the auxiliary burner communicating with the slag bath zone is arranged at a bottom of the slag bath zone. A combustion temperature of pure oxygen and pulverized coal in the combustion zone is up to 1800 to 2000° C.; solid mineral aggregates above the phosphate rock reduction zone are molten to enter the phosphate rock reduction zone, fuel gas is introduced, by the auxiliary burner, into the reduction area and the slag bath zone for stamping and liquid sealing, and a slag discharge operation is performed by pressure regulation. Syngas containing phosphorous vapor is fed to a subsequent separation and purification unit through the gas product outlet formed in the top of the phosphorus coal gasification reactor, liquid-state molten slags enter the slag quench chamber for water quenching to form glass having crystallites of about 1 mm, which is discharged to the slag lock hopper.

Further, the stock bin is configured for feeding a solid mineral aggregate mixture of phosphate rock, coke and silica, intermittent feeding is performed through regulation of the inlet airlock valve and the outlet airlock valve of the mineral aggregate lock hopper.

In some embodiments, the solid mineral aggregate mixture in the reaction device has an acidity value, $SiO2+Al2O3/CaO$, of 0.7 to 0.95.

Further, fuel entering the fuel burners is any one of oxygen, pulverized coal, oxygen plus water vapor, oxygen plus water vapor plus pulverized coal, and oxygen plus pulverized coal.

In some embodiments, raw materials in the stock bin are massive phosphate rock, silica and coke, or regular massive materials formed by grinding, bonding, press-molding and sintering one or more of phosphate rock, silica and coke.

Further, a main body of the phosphorus coal gasification reactor is a housing having pressure resistance of 1.0 to 4.0 MPa, and a fireplace slag layer, a lining, refractory bricks and a shell are provided from inside to outside when viewed in a cross-section view.

An inlet pressure of the auxiliary burner depends on residence time required for phosphate rock reduction.

The technical effects generated by the technical solutions above are: a reduction reaction system of the phosphate rock is introduced, by the device, into the coal gasification process, the coal gasification and the phosphate rock reduction reaction are coupled in one set of gasification equipment, the heat generated in the coal gasification process is used for supplying heat for phosphate rock reduction, the use amount of cosolvents such as silica is reduced by using silicon and aluminum elements contained in coal ash content, thereby increasing the yield of the phosphorus as well as reducing emission of $CO_2$.

BRIEF DESCRIPTION OF THE DRAWINGS

The following describes the present disclosure in detail with reference to the accompanying drawings and specific embodiments.

FIG. 1 is a schematic structural diagram of a device according to an embodiment of the present disclosure.

Reference numerals: 1 stock bin, 2—mineral aggregate lock hopper; 2-1—inlet airlock valve; 2-2—outlet airlock valve; 3—phosphorus coal gasification reactor; 3-1—drying zone; 3-2—dry distillation zone; 3-3—combustion zone; 3-4—phosphate rock reduction zone; 3-5—slag bath zone; 4—gas outlet; 5—combined fuel feeding burner; 6—auxiliary burner; 7—slag quench chamber; 8—slag lock hopper.

DETAILED DESCRIPTION OF THE EMBODIMENTS

The following clearly and completely describes the technical solutions in the embodiments of the present disclosure with reference to the accompanying drawings in the embodiments of the present invention. Apparently, the described embodiments are merely a part rather than all of the embodiments of the present disclosure. All other embodiments obtained by those skilled in the art based on the embodiments of the present disclosure, without paying creative efforts, shall fall within the protection scope of the present disclosure.

Numerous specific details are set forth in the following description to provide a thorough understanding of the present disclosure, but the present disclosure may be implemented in other ways than those described herein. Those skilled in the art may make similar generalization without departing from the connotation of the present disclosure. The present disclosure is therefore not to be limited by the specific embodiments disclosed below.

As shown in FIG. 1, a phosphorus coal gasification reaction device for combined production of yellow phosphorus and syngas includes a stock bin 1. Raw materials in the stock bin 1 are massive phosphate rock, silica and coke, or regular massive materials formed by grinding, bonding, press-molding and sintering one or more of phosphate rock, silica and coke. A discharge port of the stock bin 1 is connected to a mineral aggregate lock hopper 2 by an inlet airlock valve 2-1, and a lower opening of the mineral aggregate lock hopper 2 is connected to an upper feeding port of a phosphorous coal gasification reactor 3 by an outlet airlock valve 2-2. The stock bin 1 is used for feeding a solid mineral aggregate mixture of phosphate rock, coke and silica, intermittent feeding is performed through the regulation of the inlet airlock valve 2-1 and the outlet airlock valve 2-2 of the mineral aggregate lock hopper 2.

A slag discharge port at the bottom of the phosphorous coal gasification reactor 3 is connected to an inlet of a slag quench chamber 7, a slag outlet of the slag quench chamber 7 is connected to an inlet of a slag lock hopper 8, and molten slags are discharged via the slag lock hopper 8. In the phosphorus coal gasification reactor 3, a drying zone 3-1, a dry distillation zone 3-2, a combustion zone 3-3, a phosphate rock reduction zone 3-4, and a slag bath zone 3-5 are formed from top to bottom. A main body of the phosphorus coal gasification reactor 3 is a housing having pressure resistance of 1.0 to 4.0 MPa, and a fireplace slag layer, a lining, refractory bricks and a shell are provided from inside to outside when viewed in a cross-section view. A gas product outlet 4 communicating with the phosphorus coal gasification reactor 3 is installed at the top of the phosphorus coal gasification reactor 3, two to eight combustion burners 5 are symmetrically arranged on the combustion zone 3-3, and an auxiliary burner 6 communicating with the slag bath zone 3-5 is arranged at the bottom of the slag bath zone 3-5. The fuel entering the fuel burner 5 is any one of oxygen, pulverized coal, oxygen and water vapor, oxygen and water vapor and pulverized coal, and oxygen and pulverized coal. In some embodiments, the fuel burner 5 injects oxygen and pulverized coal into the reactor in a jet flow manner to reduce the consumption of coke in the mineral aggregates by rising crude syngas.

The phosphate rock is proportioned to make the $P_2O_5$ content thereof reach 18%-25% by weight, and the material, $(SiO_2+Al_2O_3)/CaO$, has an acidity value of 0.7-0.95. Regarding the acidity value, the $SiO_2$, $Al_2O_3$, CaO carried by the phosphate rock and coal must be considered. In a case that the $SiO_2+Al_2O_3$ in the phosphate rock and coal are not enough, the required acidity value will be achieved by adding silica. The ingredients of phosphate rock may be phosphate rock lumps, granular coke and silica lumps. It is also possible to mix the ore fines of the phosphate rock, coke and silica into pellets according to a calculated ratio for charging.

The proportioned phosphate rock briquettes are intermittently fed via the stock bin 1, and through the regulation of the 2-1 inlet airlock valve and the 2-2 outlet airlock valve, the phosphate rock briquettes are pressurized by the mineral aggregate lock hopper 2 to enter the reactor 3. The phosphate rock briquettes are subjected to heat exchange with the bottom-up process gas at an upper portion of the reactor, forming the drying zone 3-1 and the dry distillation zone 3-2 in sequence. The process gas is cooled to 300 to 700° C. and then enters the next process from the gas outlet 4 at an upper seal of the reactor 3.

Along with the falling of the phosphate rock briquettes, the solid material is close to the combustion zone 3-3, the temperature is further increased to 1500 to 1700° C., and the phosphate rock briquettes are molten gradually to enter the phosphate rock smelting reduction zone 3-4. The phosphate rock is reduced by the carbon (coke or coal) at a high temperature of 1400 to 1600° C. to generate phosphorus vapor, and non-volatile substances form slags to enter the slag bath zone 3-5. The slag bath zone 3-5 is subjected to liquid seal by a high-temperature fuel gas fed by the auxiliary burner 6, the pressure at the auxiliary burner is reduced when slags need to be discharged. The liquid slags flow into the slag quench chamber 7 for water quenching in the slag quench chamber filled with water to form glass slags with a coagulation performance, which are discharged via the slag lock hopper 8 for sail. The pressure of the auxiliary burner 6 depends on the residence time required for phosphate rock reduction.

The fuel is injected, by two to eight fuel burners 5, into the furnace to form the combustion zone 3-3 for the oxidation of the coal, and the temperature at the combustion center is above 2,000° C. to provide energy required for the reduction reaction of the phosphate rock. A gas chamber is formed in the combustion zone to support the solid mineral aggregates above the combustion zone and to heat the phosphate rock briquettes. The fuel for the combustion burner may be any one of oxygen, oxygen and (water) vapor, oxygen and (water) vapor and pulverized coal, and oxygen and pulverized coal. When oxygen is employed, the combined fuel feeding burner 5 only provides combustion improver, while the fuel is coal briquette, anthracite or coal char, and is fed, by the stock bin 1, from the top of the reaction zone, along with the solid phosphate rock briquettes. In order to control the temperature at the combustion center zone, it is possible to employ the (water) vapor accompanied by the oxygen; When oxygen and pulverized coal is employed, the fuel and the combustion improver provided by the combined fuel feeding burner 5 simultaneously enter the combustion zone 3-3 from the fuel feeding burner 5.

In conclusion, the combustion zone 3-3 of the reactor provides the high temperature of 1,800-2,000° C. and the required energy for the reduction process, instead of a heat supply mode of the original yellow phosphorus electric furnace; a phosphorus-coal coupling continuous reactor is provided, and the thermal energy dissipation of the system is controlled to not exceed 2%. The combined production of the yellow phosphorus and the syngas is achieved by employing an automatic liquid phase slag discharging system.

What is claimed is:

1. A phosphorus coal gasification reaction device for combined production of yellow phosphorus and syngas, comprising a stock bin, a mineral aggregate lock hopper, a phosphorous coal gasification reactor, a gas product outlet, combustion burners, an auxiliary burner, a slag quench chamber, and a slag lock hopper; wherein a discharge port of the stock bin is connected to the mineral aggregate lock hopper by an inlet airlock valve, and a lower opening of the mineral aggregate lock hopper is connected to an upper feeding port of the phosphorous coal gasification reactor by an outlet airlock valve; a slag discharge port at a bottom of the phosphorous coal gasification reactor is connected to an inlet of the slag quench chamber, and a slag outlet of the slag quench chamber is connected to an inlet of the slag lock hopper, and molten slags are discharged via the slag lock hopper; the phosphorus coal gasification reactor is divided into a drying zone, a dry distillation zone, a combustion zone, a phosphate rock reduction zone, and a slag bath zone from top to bottom; wherein the phosphate rock reduction zone tapers in a direction from the combustion zone to the slag bath zone, the gas product outlet communicating with the phosphorus coal gasification reactor is installed at a top of the phosphorus coal gasification reactor, and two to eight combustion burners are symmetrically arranged on the combustion zone; the auxiliary burner communicating with the slag bath zone is arranged at a bottom of the slag bath zone; a combustion temperature of pure oxygen and pulverized coal in the combustion zone is up to 1800 to 2000° C.; solid mineral aggregates above the phosphate rock reduction zone are molten to enter the phosphate rock reduction zone, the auxiliary burner is configured to introduce fuel gas into the phosphate rock reduction zone and the slag bath zone for stamping and liquid sealing and is configured to reduce a pressure at the auxiliary burner when slags need to be discharged, and a slag discharge operation is performed by pressure regulation; syngas containing phosphorous vapor is fed to a subsequent separation and purification unit through the gas product outlet formed in the top of the phosphorus coal gasification reactor, liquid-state molten slags enter the slag quench chamber for water quenching to form glass having crystallites of about 1 mm, which is discharged to the slag lock hopper.

2. The phosphorus coal gasification reaction device according to claim 1, wherein the stock bin is configured for feeding a solid mineral aggregate mixture of phosphate rock, coke and silica, intermittent feeding is performed through regulation of the inlet airlock valve and the outlet airlock valve of the mineral aggregate lock hopper.

3. The phosphorus coal gasification reaction device according to claim 1, wherein the solid mineral aggregate mixture in the reaction device has an acidity value $SiO_2+Al_2O_3/CaO$, of 0.7 to 0.95.

4. The phosphorus coal gasification reaction device according to claim 1, wherein fuel entering the fuel burners is any one of oxygen, pulverized coal, oxygen plus water vapor, oxygen plus water vapor plus pulverized coal, and oxygen plus pulverized coal.

5. The phosphorus coal gasification reaction device according to claim 1, wherein raw materials in the stock bin are massive phosphate rock, silica and coke, or regular massive materials formed by grinding, bonding, press-molding and sintering one or more of phosphate rock, silica and coke.

6. The phosphorus coal gasification reaction device according to claim 1, wherein a main body of the phosphorus coal gasification reactor is a housing having pressure resistance of 1.0 to 4.0 MPa, and a fireplace slag layer, a lining, refractory bricks and a shell are provided from inside to outside when viewed in a cross-section view.

7. The phosphorus coal gasification reaction device according to claim 1, wherein an inlet pressure of the auxiliary burner depends on residence time required for phosphate rock reduction.

\* \* \* \* \*